(12) United States Patent
Lefferts et al.

(10) Patent No.: US 6,216,833 B1
(45) Date of Patent: Apr. 17, 2001

(54) VIBRATION DAMPER AND METHOD OF MAKING SAME

(75) Inventors: Scott R. Lefferts, Arlington; James W. LaFleur, Findlay, both of OH (US)

(73) Assignee: Bridgestone/Firestone, Inc., Akron, OH (US)

( * ) Notice: Subject to any disclaimer, the term of this patent is extended or adjusted under 35 U.S.C. 154(b) by 0 days.

(21) Appl. No.: 09/359,459

(22) Filed: Jul. 22, 1999

(51) Int. Cl.[7] .................................................... F16F 9/32
(52) U.S. Cl. .................. 188/380; 267/141.2; 267/141.4; 267/136; 267/140.12
(58) Field of Search ........................ 267/140.11, 140.12, 267/292, 293, 141.2, 136, 153, 141.4, 141.5, 140.5, 294, 150; 188/379, 380; 248/560, 563, 573, 609

(56) References Cited

U.S. PATENT DOCUMENTS

| | | | |
|---|---|---|---|
| 2,939,326 | * 6/1960 | Dietrich | 267/150 |
| 3,419,111 | 12/1968 | Jones et al. | 188/1 |
| 3,813,776 | * 6/1974 | Frederickson et al. | 248/659 |
| 4,580,666 | 4/1986 | Ferguson | 188/379 |
| 4,800,306 | 1/1989 | Oberto | 310/51 |
| 4,889,328 | 12/1989 | Uno et al. | 267/293 |
| 5,080,331 | * 1/1992 | De Fontenay | 267/140.12 |
| 5,190,269 | * 3/1993 | Ikeda et al. | 267/141.2 |
| 5,295,653 | * 3/1994 | Miyazaki et al. | 267/141.2 |
| 5,295,670 | * 3/1994 | Tsukamoto et al. | 267/140.5 |
| 5,769,380 | 6/1998 | Hibi et al. | 248/562 |
| 5,799,930 | 9/1998 | Willett | 267/141.4 |
| 5,876,023 | 3/1999 | Hain et al. | 267/141.4 |
| 5,876,024 | 3/1999 | Hain | 267/141.4 |

* cited by examiner

Primary Examiner—Robert J. Oberleitner
Assistant Examiner—Mariano Sy
(74) Attorney, Agent, or Firm—Michael Sand; Thomas R. Kingsbury

(57) ABSTRACT

A vibration damper for mounting on a structure for damping out resonance frequencies on the structure has a bushing assembly consisting of inner and outer coaxial spaced metal sleeves joined together by an intervening elastomeric member. A metal mass is secured to the outer metal sleeve of the bushing assembly and oscillates about the fixed inner sleeve upon flexing of the elastomeric member. A fastener extends through the bore of the inner sleeve for rotatably suspending the damper on the structure. An extension arm is secured to the inner sleeve and extends radially outwardly and passes between a pair of nubs formed on an outer annulus of the elastomeric member to prevent excessive rotation and erratic motion of the mass due to non-translational forces on the structure.

27 Claims, 3 Drawing Sheets

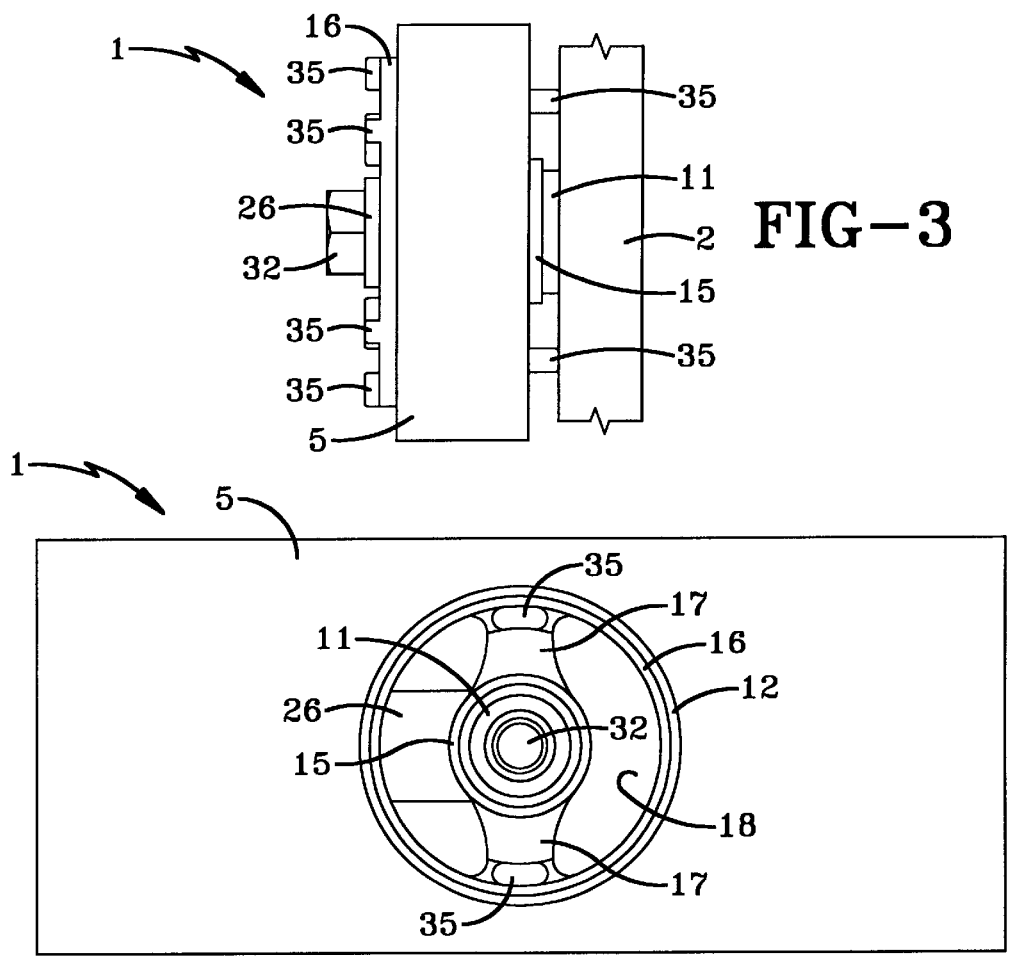
FIG-3
FIG-4
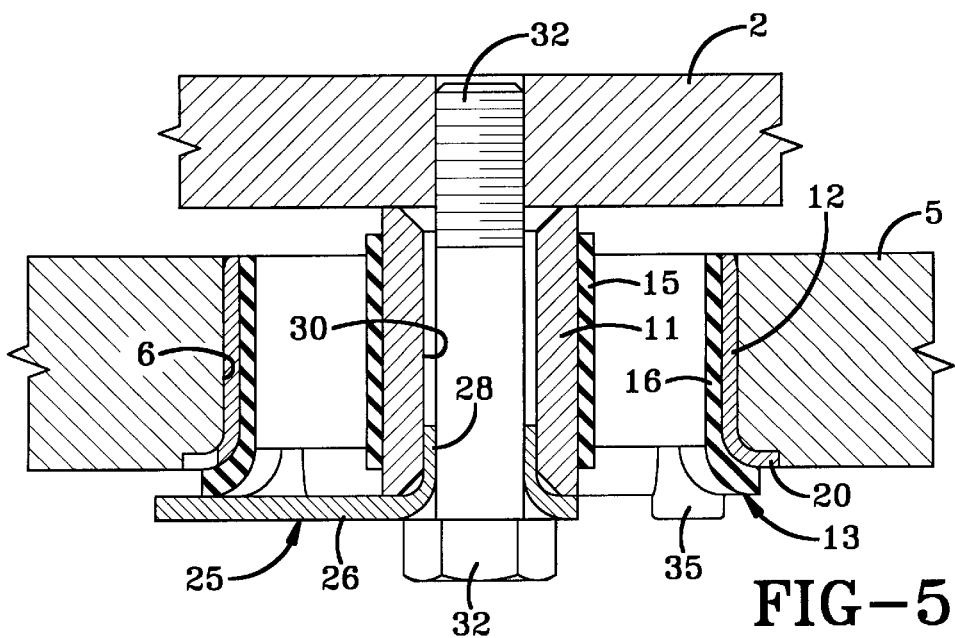
FIG-5

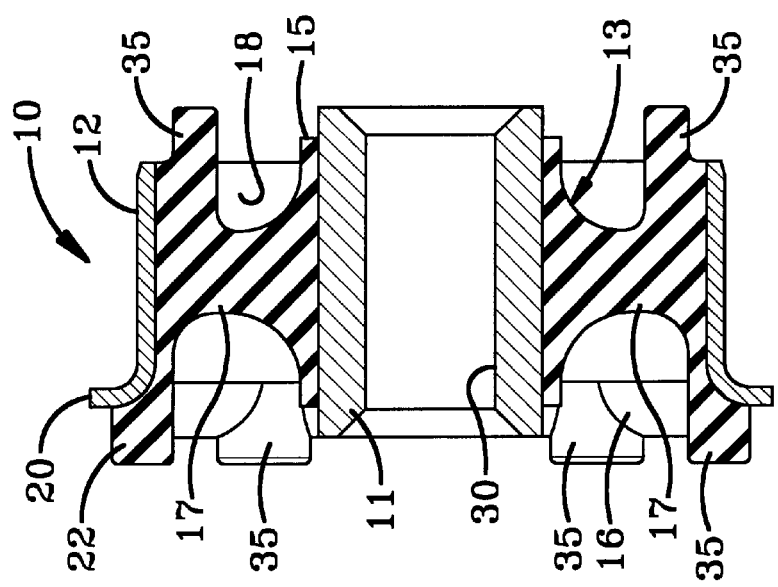
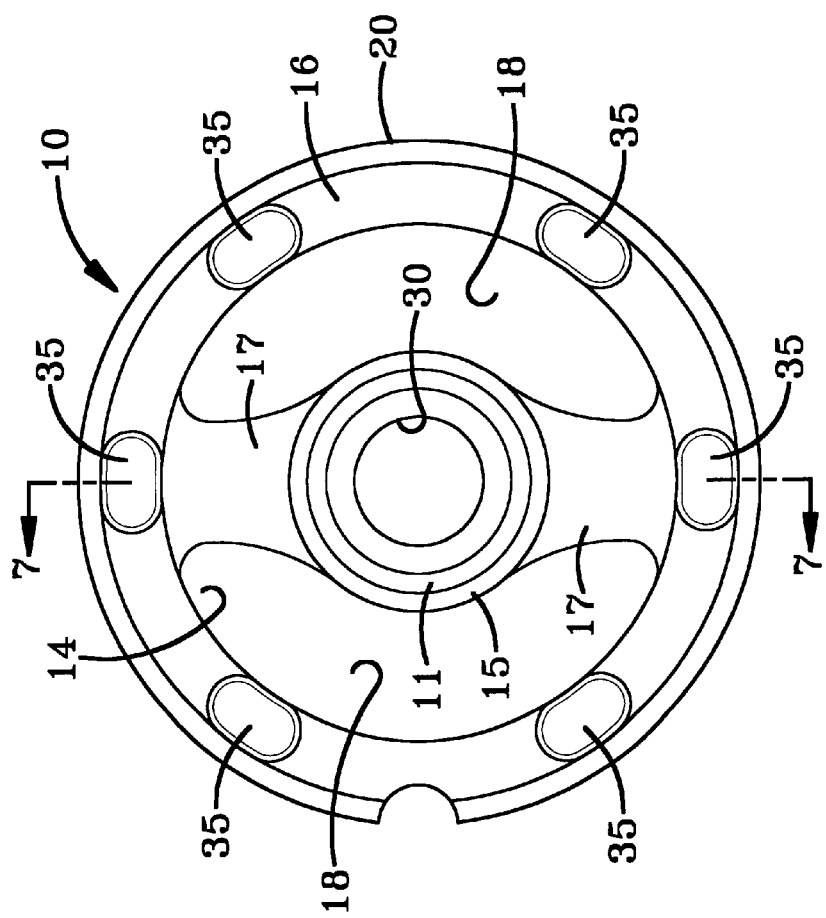

VIBRATION DAMPER AND METHOD OF MAKING SAME

BACKGROUND OF THE INVENTION

1. Technical Field

The invention relates to vibration dampers and in particular to a damper for use in a vehicle and specifically to a damper for mounting in the vehicle seat to isolate resident frequencies imparted on the passenger's seats. Even more particularly the invention relates to such a vibration damper having an anti-rotational device to prevent excessive rotation of the damping mass due to non-translational vehicle inputs.

2. Background Information

Damping devices and in particular dynamic dampers, are currently used in many applications and in particular in the automobile industry for damping out various vibrations imparted on portions of the vehicle caused by the engine, tires and road conditions. One problem that exists is that vibrations which result from resonance frequencies are imparted on the passenger seats of minivans which eventually could cause discomfort to the passenger.

Various types of dampers have been used to dampen out unwanted vibrations on various structures. These are generally of the shear type dampers in which a mass is attached in some fashion to an elastomeric member wherein the elastomeric material is bonded directly to the mass with the elastomer acting in shear. These dampers are then attached in some fashion to the structure or vehicle for damping out the unwanted frequencies.

Other types of dampers use a bushing arrangement wherein an elastomer is bonded between inner and outer cylindrical members such as shown in U.S. Pat. No. 5,769,380 and 4,889,328. Various other dampers using an elastomer and a damping mass are shown in U.S. Pat. Nos. 4,580,666; 4,800,306; 3,419,111; 5,876,023; 5,876,024 and 5,799,930.

However, a problem that occurs in such dampers is that the dampers are prone to exhibit very erratic motion both translational and rotational caused by excessive rotation due to non-translational vehicle inputs.

None of these prior art dampers, especially those that have a suspended mass, have any type of anti-rotational device to limit the angular swing of the mass which reduces the effectiveness desired to be achieved thereby. Likewise, many of the prior art damping devices, especially those intended for use in a vehicle seat, are difficult to manufacture in an economical manner and in a size and weight acceptable for use in the automotive industry.

Therefore, the need exists for an improved vibration damper intended primarily for use in a vehicle seat, which is relatively easy and inexpensive to manufacture and which may include an anti-rotational device to avoid erratic motion of the damper.

SUMMARY OF THE INVENTION

Objectives of the invention include providing an improved vibration damper for suspending on a structure such as a vehicle seat, which has a bushing assembly formed by inner and outer coaxial metal sleeves with an intervening elastomeric member, with a mass being attached to the outer sleeve by a press fit engagement thereby eliminating the need to place the mass in a vulcanizing mold when the elastomeric member is vulcanized and secured to the inner and outer sleeves.

Still another objective of the invention is to provide such a vibration damper which includes an anti-rotational device to restrict rotational motion of the damper, preferably by use of a metal extension arm secured to the inner metal sleeve and extending between a pair of elastomeric nubs formed integrally with the elastomeric member of the bushing assembly.

A further objective of the invention is to provide such a vibration damper in which the size of the mass can be easily adjusted and changed for particular applications and then press fitted onto the inner sleeve of the bushing assembly thereby providing for a larger range of damping applications with less components.

Another objective of the invention is to provide such a vibration damper in which the elastomeric member can have various shapes to achieve different spring characteristics without affecting the primary size and shape of the inner and outer metal sleeves thereby providing increased versatility to the damper.

A further objective of the invention is to provide such a vibration damper in which the outer metal sleeve has an annular flange over which the elastomeric material extends so as to act as a bumper to prevent any excess motion of the damper in a direction which is perpendicular to the primary direction of motion.

A still further objective of the invention is to provide such a vibration damper whereby after molding the elastomeric member to the inner and outer metal sleeves the bushing assembly is press fitted into the selected mass size, which mass can be manufactured either as a casting or from machined bar stock with a center opening of the mass being machined to tight tolerances so that the bushing can be pressed in and held by a press fit engagement without requiring additional attachment fasteners.

Another objective of the invention is to provide such a vibration damper in which the damper is attached easily to the vehicle by use of a single bolt or other fastener which extends through the bore of the inner metal sleeve to suspend the damper from the structural member, such as the interior of a vehicle seat.

These objectives and advantages are obtained by the vibration damper of the present invention, the general nature of which includes inner and outer coaxial sleeves defining an annular space therebetween; an elastomeric member disposed in at least a portion of the annular space and secured to the inner and outer sleeves and interconnecting said sleeves; a mass secured to the outer sleeve for movement with said sleeve; attachment means for mounting the inner sleeve to the structure whereby said outer sleeve and mass is free to oscillate about said inner sleeve to dampen out vibration on the structure; and an anti-rotation device for limiting angular movement of the mass about the inner sleeve.

These objectives and advantages are further obtained by the method of the present invention, the general nature of which may be stated as including the steps of providing a mass having an opening formed therein; providing inner and outer coaxial sleeves; securing an elastomeric member to said inner and outer sleeves in an annular space formed between said sleeves to form a bushing assembly; and securing the bushing assembly to the mass within the opening in said mass.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 3 is an enlarged fragmentary side elevational view of FIG. 1 showing the vibration damper mounted on the structure;

FIG. 4 is a back plan view of the vibration damper of FIG. 2;

FIG. 5 is a sectional view taken on line 5—5, FIG. 2;

FIG. 6 is an enlarged plan view of the bushing assembly removed from the damper; and FIG. 7 is a sectional view taken on line 7—7, FIG. 6.

Similar numerals refer to similar parts throughout the drawings.

DESCRIPTION OF THE PREFERRED EMBODIMENT

Figure 1:
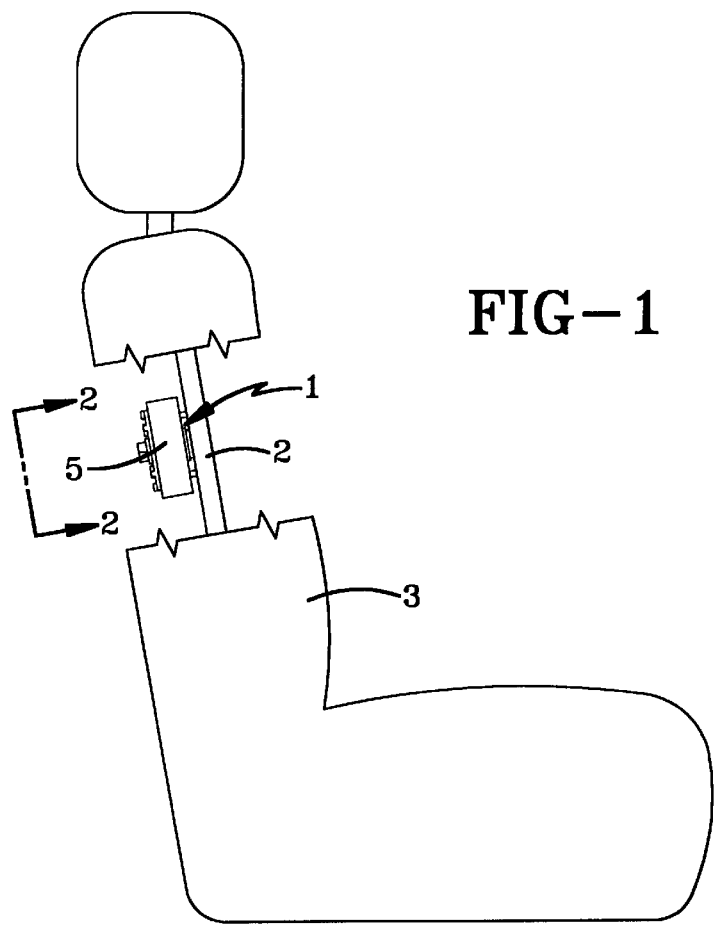
FIG. 1 is a fragmentary diagrammatic view with portions broken away showing the vibration damper of the present invention mounted on a structure, such as the interior of a vehicle seat

The vibration damper of the present invention is indicated generally at 1, and is shown in FIG. 1 mounted on a bracket 2 located within the interior of a vehicle seat 3, which in the preferred embodiment will be a passenger seat of a minivan. Although the damper is intended primarily for use within a vehicle seat, it need not be limited to such an application but could be used for other types of dynamic damping applications.

Figure 2:
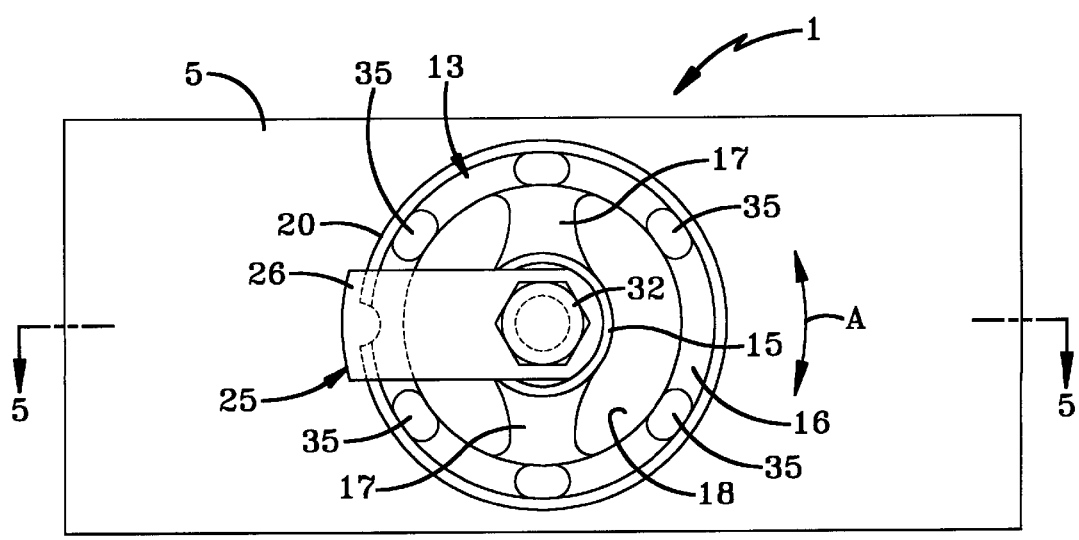
FIG. 2 is an arranged front plan view of the vibration damper looking in the direction of a 2—2, FIG. 1.

Referring to FIGS. 2–7, damper 1 includes a mass 5 which preferably is formed of metal such as a metal casting or cut from bar stock, or formed of various other types of metals or heavy materials. Mass 5 preferably has a rectangular shape as shown in FIG. 2 although other configurations could be used without departing from the concept of the invention. A central opening 6 (FIG. 5) is formed through mass 5 and preferably is accurately machined, the purpose of which is discussed further below. A bushing assembly indicated generally at 10, is shown particularly in FIGS. 6 and 7 and includes an inner sleeve 11 and an outer sleeve 12 which are coaxially aligned and form an intervening annular space 14. Sleeves 11 and 12 are connected by an elastomeric member indicated generally at 13, located in annular space 14. In the preferred embodiment, inner sleeve 11 preferably is formed of metal tubing or a wrapped sleeve configuration, with outer sleeve 12 being formed of metal such as a steel stamping. The diameter of outer sleeve 12 is determined based upon the spring rate necessary to obtain the correct natural frequency. Elastomeric member 13 preferably is non-symmetrical and includes an inner annulus 15 which extends about inner sleeve 11, and an outer annulus 16 connected to inner annulus 15 by a pair of radial extending diametrically aligned legs 17 which form voids 18 therebetween.

In accordance with one of the features of the method of the invention for forming vibration damper 1, the uncured elastomeric material which forms elastomeric member 13 will be injected between inner and outer sleeves 11 and 12 in an appropriate mold to form bushing assembly 10 with elastomeric member 13 being bonded to the spaced sleeves during the vulcanizing process. Before placing the metal sleeves in the vulcanizing mold, the metal preferably is first phosphated and cemented to provide for a satisfactory bond between the elastomeric member and the metal sleeves. As shown in FIG. 2, the elastomeric member 13 is non-symmetrical with the radial legs 17 extending in the vertical direction with respect to the mounting of damper 1 as shown in FIG. 1, whereas in the lateral direction the elastomeric material is highly voided as shown by voids 18. This sectional configuration results in a higher spring rate in the vertical direction and a lower spring rate in the lateral direction which has been found to provide the desired damping characteristics when used in vehicle seat 3.

Outer metal sleeve 12 is formed with an outwardly extending annular flange 20 over which the elastomeric material of outer annulus 16 extends as shown in FIGS. 6 and 7. This covering of elastomeric material acts as a bumper to prevent any excess motion of the damper in a direction which is perpendicular to the rotational direction of motion indicated by arrow A in FIG. 2. Flange 20 also functions as a stop when bushing assembly 10 is mounted within central opening 6 of mass 5, preferably by a press fit engagement therebetween.

In accordance with another feature of the invention, an anti-rotational device indicated generally at 25, is mounted on bushing assembly 10. Device 25 includes a metal extension arm 26 which extends radially outwardly from inner sleeve 11. Arm 26 terminates in a hub 28 which preferably is press fitted into inner bore 30 of sleeve 11 so as to be securely fixed therewith.

Damper 1 is easily mounted on bracket 2 or other type of support structure, by use of a bolt 32 which extends through bore 30 of inner sleeve 11 and presses tightly against hub 28 securing damper 1 to bracket 2. Other types of mounting mechanisms than bolt 32 can be used without effecting the invention. When mounted on bracket 2, damper 1 is suspended entirely by bolt 32 enabling mass 5 to oscillate freely about inner sleeve 11 since inner sleeve 11 is firmly secured to the bracket by bolt 32, as shown by arrow A, FIG. 2, upon the flexing of elastomeric legs 17.

Fixed arm 26 extends between a pair of spaced nubs 35 to limit the rotational or angular movement of mass 5. Nubs 35 preferably are formed of an elastomeric material as an integral part of outer annulus 16. Nubs 35 extend upwardly outwardly from annulus 16 and engage the outer extended fixed end of arm 26 and function as stops to limit the rotational angular movement of annulus 16 and correspondingly mass 5. Heretofore, known bushing type dampers have no anti-rotational devices and are proned to exhibit very erratic motion both translational and rotational, and permit excessive rotation due to non-translational vehicle inputs. Nubs 35 provide limit stops in all directions and will provide the restrictions necessary to minimize noise during off road durability testing and actual on road riding experience. Nubs 35 can be designed depending upon their circumferential spacing about outer annulus 16, to allow a specific amount of travel of the mass at the spring rate necessary to obtain the proper natural frequency while avoiding the erratic behavior as occurs with prior art dampers. Arm 26 is fixed at the desired location between a pair of adjacent nubs 35 and is secured in its desired position by the clamping engagement of bolt 32 against the outer surface of hub 28 as shown in FIG. 5.

The simplified method of the present invention of manufacturing and assembling damper 1 includes mass 5 being formed by various inexpensive procedures since tolerances are not critical except for the formation of opening 6 which may require precision machining in order to provide for the desired press fit engagement with the outer surface of outer sleeve 12. Likewise, bushing assembly 10 is formed at the time elastomeric member 13 is formed and vulcanized enabling bushing assembly 10 to be formed at a remote location and then assembled easily into mass 5 at a separate location, after which only the insertion of bolt 32 into bore 30 is required to mount damper 1 on a supporting structure.

Accordingly, the improved vibration damper and method of producing the same provides a structure and method which requires very simply tooling yet provides a robust low scrap product which is easily manufactured and assembled and easily installed on various types of supporting brackets, and which offers a limit stop in all directions that will provide the restrictions necessary to minimize noise and vibration. It also provides a damper in which the elastomeric member can have various shapes to achieve various damping characteristics without affecting the primary size and shape of the inner and outer metal sleeves and attached damping mass.

Accordingly, the improved vibration damper is simplified, provides an effective, safe, inexpensive, and efficient device and associated method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vibration damper is construed and used, the characteristics of the construction, and the advantageous, new and useful results obtained; the new and useful structures, devices, elements, arrangements, parts, combinations and method steps, are set forth in the appended claims.

What is claimed is:

1. A vibration damper for mounting on a structure for damping out vibrations imparted on said structure, said damper including:
   inner and outer coaxial sleeves defining an annular space therebetween;
   an elastomeric member disposed in at least a portion of the annular space and secured to and interconnecting the inner and outer sleeves;
   a mass secured only to the outer sleeve for movement with said outer sleeve upon flexing of the elastomeric member;
   attachment means for mounting the inner sleeve to the structure whereby said outer sleeve and mass are free to oscillate together about said inner sleeve to dampen out vibration on the structure; and
   an anti-rotation device operatively engaged with the mass for limiting angular movement of the mass about the inner sleeve.

2. The vibration damper defined in claim 1 in which the anti-rotation device includes an arm secured to the inner sleeve and extending radially therefrom and a plurality of spaced stops for selectively receiving an outer end of the arm therebetween.

3. The vibration damper defined in claim 1 in which the outer sleeve includes an outwardly extending flange; and in which portions of the elastomeric member extend over said flange to provide a bumper upon axial movement of the outer sleeve.

4. The vibration damper defined in claim 1 in which the elastomeric member includes inner and outer annulii secured to the inner and outer sleeves respectively, and at least a pair of radial legs extending between and connecting said annulii.

5. A vibration damper for mounting on a structure for damping out vibrations imparted on said structure, said damper including:
   an inner sleeve adapted to be mounted on the structure;
   a mass coaxially positioned about the inner sleeve;
   an elastomeric member interconnecting the inner sleeve and mass whereby said mass is free to oscillate about said inner sleeve for damping the vibrations imparted on the structure; and
   an anti-rotation device operatively engaged with the inner sleeve and mass for limiting the angular swing of said mass as it oscillates about the inner sleeve; said anti-rotation device including a plurality of circumferentially spaced stops located adjacent the mass and an extension member extending from the inner sleeve to a position between a spaced pair of the stops whereby said extension member selectively engages the spaced stops to limit the angle of oscillation of the mass as the mass oscillates about the inner sleeve to dampen vibration on the structure.

6. The vibration damper defined in claim 5 in which an outer sleeve is mounted on the mass and is coaxial with the inner sleeve and forms an annular space between said inner and outer sleeves; and in which the elastomeric member in located in the annular space and extends between and is secured to said inner and outer sleeves.

7. The vibration damper defined in claim 6 in which the inner and outer sleeves are metal.

8. The vibration damper defined in claim 5 in which the stops are mounted on an outer annular portion of the elastomeric member.

9. The vibration damper defined in claim 8 in which the stops are elastomeric nubs formed integrally with the elastomeric member and extend outwardly therefrom.

10. The vibration damper defined in claim 5 in which the mass is a generally rectangular block of metal formed with a central opening; and in which an outer sleeve is seated in said central opening and is secured to the mass.

11. The vibration damper defined in claim 10 in which the elastomeric member includes at least two radially extending legs and an outer annulus; and in which the anti-rotation device includes a plurality of spaced elastomeric nubs formed on said outer annulus and an extension arm secured to the inner sleeve and extending radially outwardly therefrom and between a pair of the spaced nubs.

12. The vibration damper defined in claim 11 in which the elastomeric member further includes an inner annulus of elastomeric material bonded to the inner sleeve.

13. The vibration damper defined in claim 10 including a fastener extending through a bore of the inner sleeve for fixedly mounting said inner sleeve on the structure.

14. A method of forming a vibration damper for subsequent suspension on a structure including the steps of:
   providing a mass;
   providing inner and outer coaxial sleeves;

securing an elastomeric member to said inner and outer sleeves in an annular space formed between said sleeves to form a bushing assembly;

securing the mass only to the outer sleeve of the bushing assembly whereby said outer sleeve and mass oscillate together about said inner sleeve; and providing an anti-rotational device to limit movement of the outer sleeve and mass about the inner sleeve.

15. The method defined in claim 14 including the step of vulcanizing the elastomeric member in a mold when securing it to the inner and outer sleeves.

16. The method defined in claim 14 in which the step of providing the anti-rotational device includes the step of securing an extension arm to the inner sleeve of the bushing assembly.

17. The method defined in claim 16 including the steps of providing a plurality of spaced stops on the bushing assembly adjacent the outer sleeve and locating an outer portion of the extension arm between a selected pair of adjacent stops.

18. The method defined in claim 14 including the step of inserting a fastener through a bore of the inner sleeve for subsequently suspending the damper on the structure.

19. The method defined in claim 14 including the steps of forming an outwardly extending flange on the outer sleeve; and extending a portion of the elastomeric member over said outwardly extending flange to form a bumper against coaxial motion of the bushing assembly.

20. The method defined in claim 16 wherein the step of securing the extension arm to the inner sleeve includes press fitting an annular boss on the arm into a bore of the inner sleeve.

21. In combination, a structure and a vibration damper mounted on said structure for damping out vibrations imparted on said structure, said combination including:

inner and outer coaxial sleeves defining an annular space therebetween;

an elastomeric member disposed in at least a portion of the annular space and secured to the inner and outer sleeves and interconnecting said sleeves;

a mass secured only to the outer sleeve for movement with said outer sleeve upon flexing of the elastomeric member;

a fastener mounting the inner sleeve to the structure whereby said outer sleeve and mass are free to oscillate about said inner sleeve upon flexing of the elastomeric member to dampen out vibration on the structure; and an anti-rotation device for limiting angular movement of the mass about the inner sleeve.

22. The combination defined in claim 21 in which the anti-rotation device includes an extension arm secured to the inner sleeve and extending radially therefrom and a plurality of spaced stops located adjacent the mass for selectively receiving an end of the extension arm between a selected pair of said stops.

23. The combination defined in claim 22 in which the elastomeric member includes inner and outer annulii bonded to the inner and outer sleeves respectively, and a pair of radially aligned legs extending between and connecting said annulii.

24. The combination defined in claim 23 in which the fastener extends generally horizontally from the structure and the mass is rotationally suspended on said fastener; and in which the pair of radial legs extend vertically and perpendicularly to the fastener.

25. The combination defined in claim 24 in which the extension arm extends generally horizontal and perpendicular to the direction of the radial legs.

26. The combination defined in claim 23 in which elastomeric member is void of material in an areas between the radially extending legs and inner and outer annulii.

27. A vibration damper for mounting on a structure for damping out vibrations imparted on said structure, said damper including:

an inner sleeve adapted to be mounted on the structure;

a mass coaxially positioned about the inner sleeve, said mass being a generally rectangular block of metal formed with a central opening having an outer sleeve seated in said central opening and secured to the mass;

an elastomeric member interconnecting the inner sleeve and mass whereby said mass is free to oscillate about said inner sleeve for damping the vibrations imparted on the structure; and an anti-rotation device operatively engaged with the inner sleeve and mass for limiting the angular swing of said mass as it oscillates about the inner sleeve.

\* \* \* \* \*